(12) United States Patent  
Portolani

(10) Patent No.: US 8,510,469 B2  
(45) Date of Patent: Aug. 13, 2013

(54) MEASURING ATTRIBUTES OF CLIENT-SERVER APPLICATIONS

(75) Inventor: Maurizio Portolani, Rolle (CH)

(73) Assignee: Cisco Technology, Inc., San Jose, CA (US)

(*) Notice: Subject to any disclaimer, the term of this patent is extended or adjusted under 35 U.S.C. 154(b) by 1017 days.

(21) Appl. No.: 12/551,128

(22) Filed: Aug. 31, 2009

(65) Prior Publication Data

US 2011/0055470 A1 Mar. 3, 2011

(51) Int. Cl.
*G06F 15/173* (2006.01)

(52) U.S. Cl.
USPC ........... 709/239; 709/203; 709/217; 709/227; 709/229; 709/238

(58) Field of Classification Search
USPC .................. 709/246, 203, 217, 219, 227, 229, 709/238, 239
See application file for complete search history.

(56) References Cited

U.S. PATENT DOCUMENTS

| 7,002,965 | B1* | 2/2006 | Cheriton | 370/395.32 |
|---|---|---|---|---|
| 7,062,571 | B1* | 6/2006 | Dale et al. | 709/239 |
| 2002/0099818 | A1* | 7/2002 | Russell et al. | 709/224 |
| 2002/0184363 | A1* | 12/2002 | Viavant et al. | 709/224 |
| 2009/0204669 | A1* | 8/2009 | Allan | 709/203 |

FOREIGN PATENT DOCUMENTS

WO    WO 02/086743 A1    10/2002

OTHER PUBLICATIONS

European Patent Office, "International Search Report with written opinion" PCT/US2010/040302, mailed Dec. 9, 2010, 12 pages.
Current claims for PCT/US2010/040302 filed Jun. 29, 2010, 7 pages.

* cited by examiner

*Primary Examiner* — Phuoc Nguyen
(74) *Attorney, Agent, or Firm* — Hickman Palermo Truong Becker Bingham Wong LLP

(57) ABSTRACT

In an embodiment, a packet data switching system comprises content-addressable memory configured to redirect, to a measurement computer, a request to access a server application program hosted at a server computer in response to receiving the request from a client computer; the measurement computer comprises request rewriting logic configured to receive the request via redirection based on the CAM, to record a first time value representing a time of receiving the request, to forward the request to the server application, to receive a response from the server computer to the request, to rewrite a payload of the response by embedding a browser-executable measurement reporting script into the payload, and to forward the rewritten response to the client; performance recording logic configured to receive a second time value from the client based on the client computer executing the measurement reporting script, and to store a performance record with the time values.

30 Claims, 4 Drawing Sheets

MEASURING ATTRIBUTES OF CLIENT-SERVER APPLICATIONS

TECHNICAL FIELD

The present disclosure generally relates to network management. The disclosure relates more specifically to techniques for measuring the end-to-end performance client-server computer application programs.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many kinds of computer service providers need to measure the performance of client-server application programs or web-based applications to evaluate and troubleshoot the application experience of remote users, without having to install agents on remote computers of the users. Examples of such computer service providers include network service providers, cellular radiotelephone network service providers, mobile wireless network operators, web-based cloud computing storage providers, and others. The end user computers may include personal computers or mobile handheld devices.

In addressing this problem, the introduction of server application virtualization systems such as VMWARE can introduce important changes in users' perceived performance of an application that was previously running on a physical machine. The deployment of server virtualization needs to be accompanied by a technology that allows the careful measurement of the clients' application performance. Thus, IT professionals who are deploying virtualization systems desire to measure perceived application performance before and after the introduction of virtualization. Network operators prefer to conduct performance measurement without using measurement appliances close to the end user computers, and wish to measure performance without degrading performance of the server-based applications that are measured.

DETAILED DESCRIPTION

Figure 1:
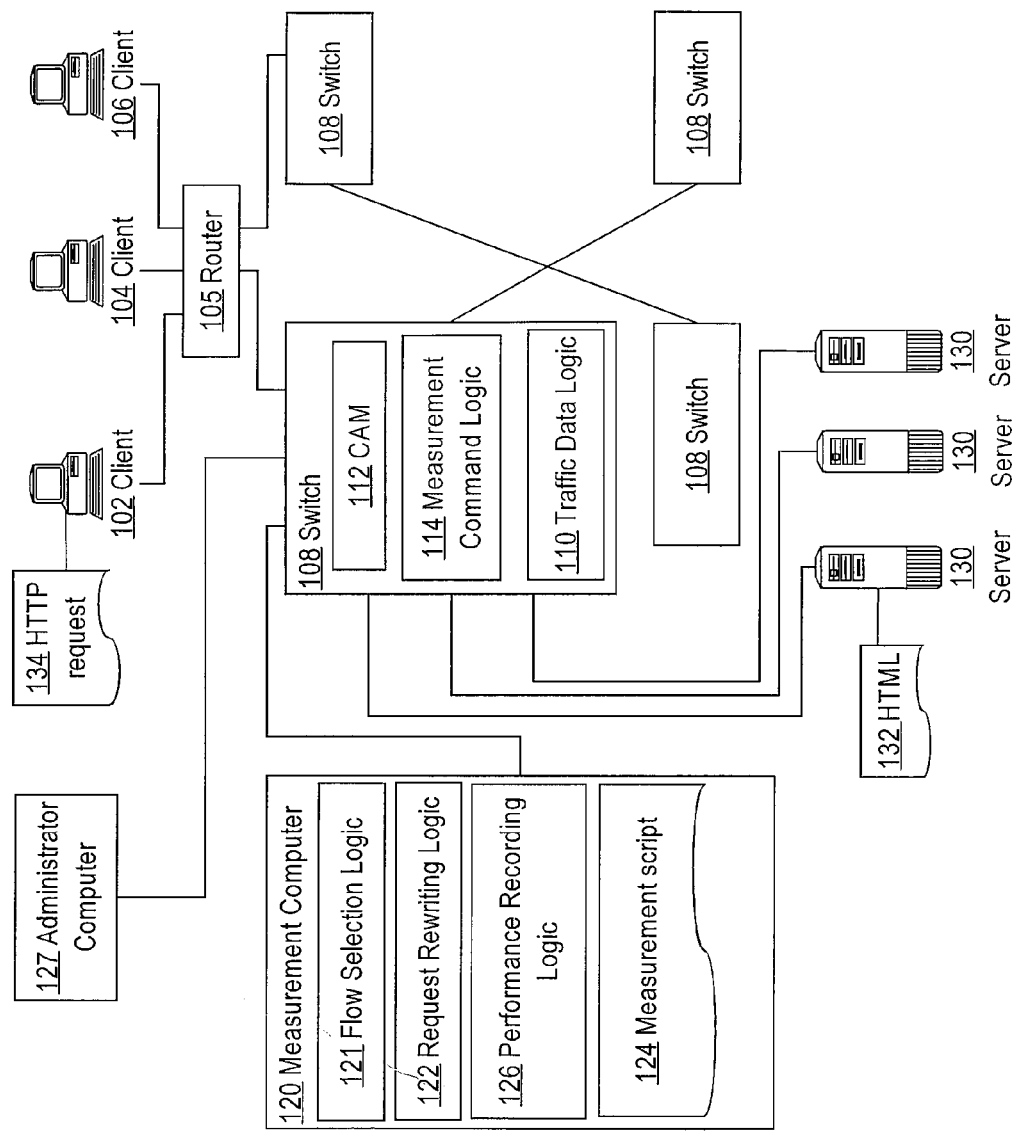
FIG. 1 illustrates a hardware-based traffic sampling and flow redirection approach for performance measurement.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
3.0 Implementation Mechanisms-Hardware Overview
4.0 Extensions and Alternatives
1.0 General Overview In an embodiment, a data processing system comprises: a packet data switching system, comprising a content-addressable memory configured to redirect, to a measurement computer, a request to access a server application program hosted at a server computer in response to receiving the request from a client computer; the measurement computer, comprising: request rewriting logic configured to receive the request of the client computer via redirection based on the content-addressable memory of the switching system, to record a first time value representing a time of receiving the request, to forward the request to the server application program, to receive a response from the server computer to the request, to rewrite a payload of the response by embedding a browser-executable measurement reporting script into the payload, and to forward the rewritten response to the client computer; performance recording logic configured to receive a second time value from the client computer based on the client computer executing the measurement reporting script, and to store a performance record that includes at least the first time value and the second time value.

In an embodiment, the content-addressable memory is a programmable ternary content-addressable memory (TCAM). In an embodiment, the request comprises a universal resource locator (URL), wherein the payload comprises hypertext markup language (HTML), and wherein the measurement reporting script comprises JavaScript.

In an embodiment, the packet data switching system is within a data center that includes the server computer. In an embodiment, the client computer is a handheld wireless computer. In an embodiment, the measurement computer and the server computer are coupled to the switching system, and the measurement computer is logically separated from a logical data path from the client computer to the server computer.

In an embodiment, the switching system further comprises network flow storage logic configured to store network flow records representing network traffic that the switching system has processed; the measurement computer further comprises network flow analysis logic configured to select a subset of the flow records and to reprogram one or more entries in the content-addressable memory of the switching system to cause redirecting, to the measurement computer, requests from client computers that are identified in the selected subset of the flow records.

In an embodiment, the server application program is unmodified, wherein no software is installed on the client computer, and wherein the measurement computer is physically or logically distant from the client computer. In an embodiment, the packet data switching system comprises any of a packet data switch and a packet data router.

In other embodiments, the invention encompasses a computer-implemented method and a computer-readable medium configured to carry out the foregoing steps.

2.0 Structural and Functional Overview

In various embodiments, performance measurement approaches find utility in a variety of network management and IT management contexts, including but not limited to: server virtualization deployments; server or data center consolidation projects; monitoring the performance of cloud computing web-based file access and storage services; and mobile applications. These contexts make visibility into users' experience of a given application important as well as complicated. However, embodiments can provide tools that allow service providers or other entities to determine the perceived performance of a given application as experienced by a client.

In an embodiment, a performance management approach is capable of obtaining traffic data from a packet data switching system, and selecting a portion of the user population based on user-definable criteria. For example, a subset of active client computers may be selected based upon an IP address mask, application protocol, or other criteria. Based on the selected subset, one or more content-addressable memory (CAM) programming strings are generated and provided to a CAM to cause redirecting portions of the traffic to a performance measurement computer. The CAM programming can be repeated periodically to redirect different traffic to the measurement computer. The performance computer may cause the CAM programming to be repeated automatically as traffic flows change and as different client computers enter and leave the network, so that the selected subset of active client computers may change dynamically over time in response to changing network conditions. Thus, the CAM programming may be continuously dynamic and responsive to changing current traffic flows.

The traffic data module can be configured to preserve existing sessions that are associated with the measurement computer.

Thereafter, requests from client computers to access a server computer application program, arriving at the switching system, are redirected to the measurement computer. The measurement computer receives a complete client request, not merely a summary or aggregation of data about multiple requests. The measurement computer forwards each received request to a server computer application program and receives a response from the server computer or application. The measurement computer then rewrites the server response by embedding a browser-executable performance measurement script into a payload portion of the response. The script is configured to cause, during execution in a browser at the client computer, measuring performance of the server computer application as seen from the client computer.

In an embodiment, the traffic data is statistical data from the Netflow module of Cisco IOS Software® hosted on a router or switch. In an embodiment, the measurement computer incorporates an HTML parser and a writer that embeds JavaScript code into the HTML payload of a server computer application program response, for the purpose of collecting statistics about the user experience of the application program.

The performance approaches herein provide numerous benefits in comparison to prior approaches. There is no requirement to install an agent or other persistently stored software on the client computers; instead, transiently stored script code executes in a browser but is not persistently stored and is removed when the client computer restarts. The approaches can be used both for personal computers and handheld computers such as wirelessly networked devices.

The approaches do not require installing a remote appliance close to the clients. The server computer application program runs unmodified. Consequently, server computer application program response time can be measured more accurately than in approaches that modify a web site or server-side program.

Further, the hardware-based sampling and redirection of the present approach, implemented using CAM at a router or switch, allows measurement to be applied to a subset of all traffic that the router or switch is processing. Therefore, if the performance measurement script introduces a minor performance degradation, only a small portion of the user population is affected. Further, the use of CAM hardware-based redirection enables the approaches herein to operate within fast networks using 10 Gigabit transmission speeds without negatively affecting the performance of the switching systems.

The approaches herein are highly scalable to large numbers of client computers, because the traffic traversing the measurement computer is only a subset of the total traffic based on the user criteria. Therefore, the measurement computer does not need to use high-performance hardware, and the performance of the measurement computer does not need to match the total performance of the data center in which the server computer is located.

In one embodiment, the measurement reporting script can be configured to determine and report information about which web sites a user is visiting, or other statistics or analytical information about the interaction of the client computer with the server computer. Various embodiments are applicable to a wide range of internetworking devices such as routers and switches and including, for example, the Cisco Nexus 7k, Cisco Catalyst 6500 Series Switches, and Cisco Catalyst 4000 Series Switches, and embodiments can be adapted for use with or integrated into the Cisco AVS 3180 Management Station, commercially available from Cisco Systems, Inc., San Jose, Calif.

In an embodiment, selection of flows for performance measurement may occur according to a variety of metrics. In an embodiment, the number of flows selected for performance measurement is determined based on the amount of traffic produced by the various applications, as indicated in a traffic database or Netflow module, to avoid overwhelming the measurement computer which could degrade application performance. In an embodiment, the measurement computer comprises logic configured to select flows that represent various users and application categories, without selecting out too many flows, and without omitting certain user categories completely.

The availability of a browser-executable script that reports performance information as seen from the client and/or analytics information is expected to have great utility in cloud computing environments, in which the client typically is not managed by the cloud computing provider. Agentless performance monitoring as disclosed herein can be used in cloud computing environments both to solve problems and to ensure compliance with service level agreements (SLAs).

FIG. 1 illustrates a hardware-based traffic sampling and flow redirection approach for performance measurement. In an embodiment, a plurality of client computers 102, 104, 106 are coupled directly or indirectly through one or more networks to a router 105, which is coupled to a data center comprising one or more switches 108 and servers 130. A measurement computer 120 is coupled directly or indirectly through one or more networks to one of the switches 108.

The client computers 102, 104, 106 may comprise any network end station such as a wired or wireless personal or handheld computer, workstation, server, printer, or other computer. Any or all of the client computers may comprise mobile devices that are coupled to router 105 wirelessly through a cellular radiotelephone network or wireless IP network. Typically each of the client computers 102, 104, 106 hosts a browser that can interact with server application programs hosted at servers 130. Client computers 102, 104, 106 typically interact with server application programs hosted at servers 130 by issuing one or more HTTP requests 134 and receiving one or more responses 132 that contain HTML payloads for parsing, execution and display at the browsers hosted at the client computers. Although certain embodiments are described herein in the context of HTTP and HTML, which include secure sockets layer (SSL) and transport layer security (TLS) transactions, other protocols may be used such as RDP.

Router 105 and switches 108 are packet data switching systems of the type commercially available from Cisco Systems, Inc., San Jose, Calif. In one embodiment, switches 108 comprise any of the Cisco Nexus 5000 and Nexus 7000 switches.

Each switch 108 comprises a content addressable memory (CAM) 112, measurement command logic 114, and traffic data logic 110. The CAM 112 comprises electronic digital hardware logic and may be a ternary CAM (TCAM) and can receive and be programmed with traffic redirection instructions. The measurement command logic 114 is configured to receive and execute commands that reconfigure the CAM to redirect selected network traffic passing through the switch 108 toward measurement computer 120. Specific functions of the measurement command logic 114 are described further herein in other sections.

Traffic data logic 110 is configured to monitor all data packets flowing through the switch 108, to associate related packets into network traffic flows, and to create and store aggregated summaries of the flows for exporting to a network management computer, or to measurement computer 120. In an embodiment, traffic data logic 110 comprises the Netflow module in Cisco IOS Software®, commercially available from Cisco Systems, Inc., San Jose, Calif.

Servers 130 host one or more server computer application programs that are useful to the client computers 102, 104, 106. Any form of client-server application programs may be used.

In an embodiment, measurement computer 120 comprises flow selection logic 121, request rewriting logic 122, one or more measurement scripts 124, and performance recording logic 127. Generally, flow selection logic 121 is configured to receive traffic flow data from switch 108, and to select a set of one or more flows for a client domain. In an embodiment, flow selection logic 121 communicates one or more commands to switch 108, for example, using simple network management protocol (SNMP), to cause traffic data logic 110 to export or return a set of traffic flow data. Selecting a set of flows could be done by performing a reverse DNS lookup on the received exported traffic flow data and examining domains associated with network addresses.

In an embodiment, flow selection logic 121 or other logic is further configured to program one or more CAM entries of CAM 112 that match a given flow, based on masked IP addresses and Layer 4 port values, to specify that future traffic arriving at the switch 108 and matching the CAM entries shall be redirected to the measurement computer 120. Thus, the CAM returns an address of the measurement computer 120 when a request or flow identifying data or client identifying data is applied to the CAM in a switching operation of the switch 108 responsive to receiving the request. In an embodiment, the redirection programming may cause redirecting such future traffic to a second, different performance measurement computer located elsewhere in the network.

In an embodiment, request rewriting logic 122 is configured to receive the full datagram for the selected flows that are redirected. In an embodiment, traffic flows or responses moving only in the server-to-client direction are redirected and received. The request rewriting logic 122 is configured to parse the HTML code that is carried in the payload of an HTTP response 132 from one of the servers 130, to insert a copy of the measurement script 124 into the payload at an appropriate point, and to forward the modified response with the script to one of the clients 102, 104, 106 indicated as destination in the server response.

Performance recording logic 126 is configured to collect statistical data as reported by the clients 102, 104, 106 that are executing the measurement script 124.

Figure 2:
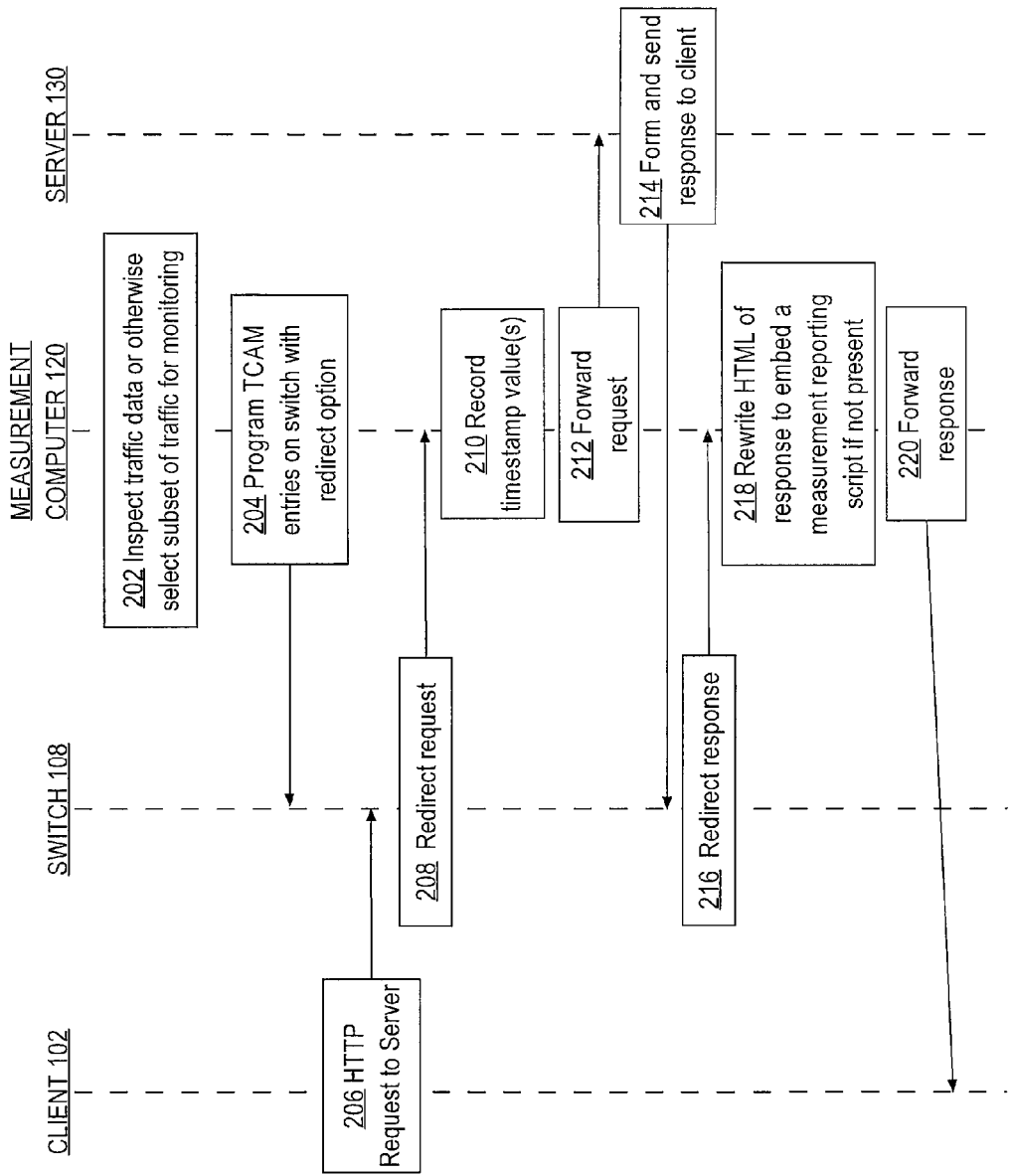
FIG. 2 illustrates a process of request redirection for performance measurement.
Figure 3:
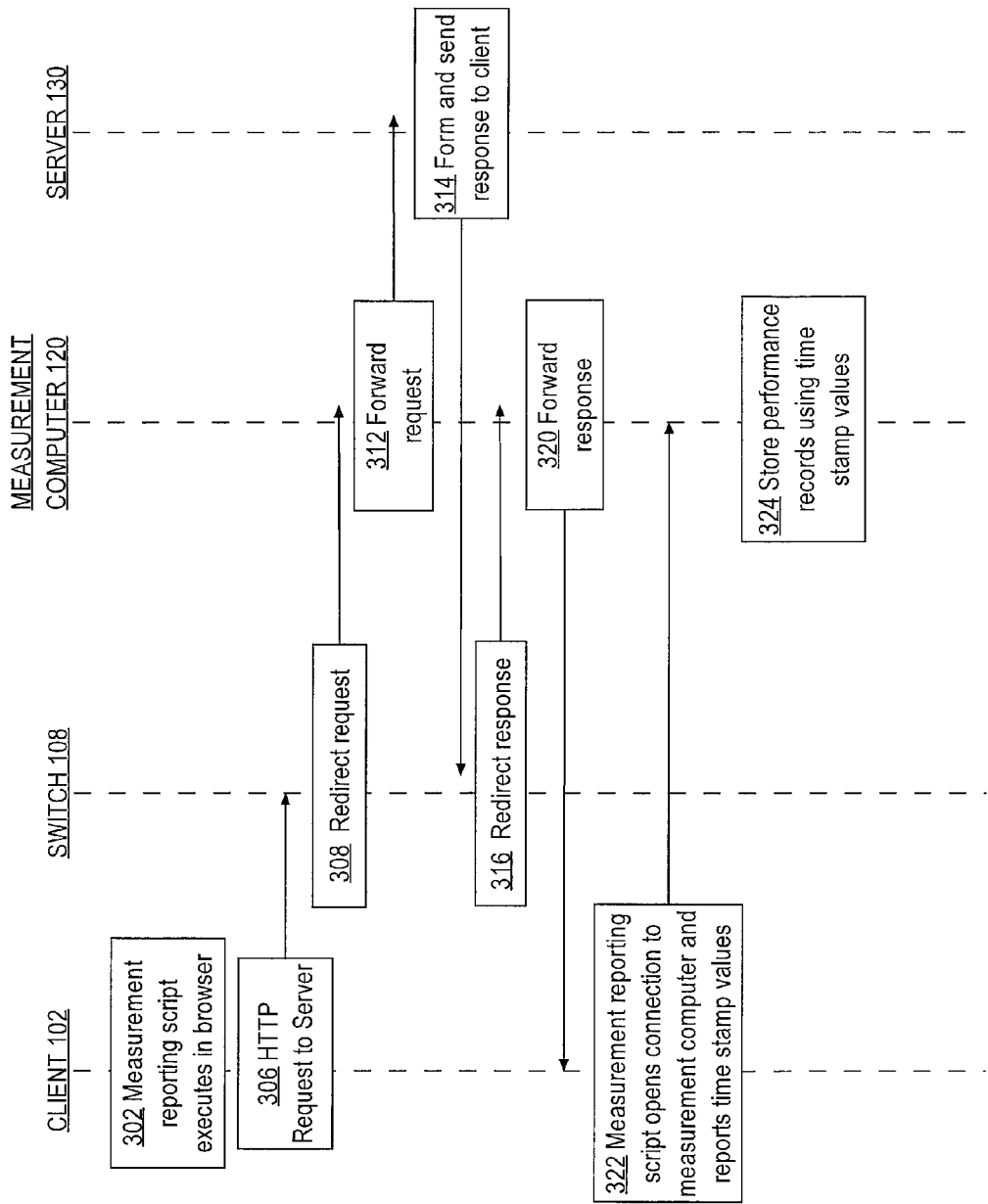
FIG. 3 illustrates a process of performance measurement using a reporting script.

FIG. 2 illustrates a process of request redirection for performance measurement; FIG. 3 illustrates a process of performance measurement using a reporting script. In an embodiment, FIG. 2 mainly relates to intercepting and processing client requests to add the reporting scrip whereas FIG. 3 mainly relates to client-side processing of scripts. Referring first to FIG. 2, at step 202, measurement computer 120 communicates with traffic data logic 110, inspects a Netflow table, or otherwise selects a subset of traffic for monitoring. For example, as an alternative, the traffic to be monitored may be configured using a configuration command entered at measurement computer 120, or based upon a configuration file, or through user input to a graphical user interface hosted at the measurement computer. Selecting traffic flows may involve selecting flows based on identifying and sampling source IP address families that are generating the most traffic, or based on user types, round trip time values, or other metrics.

In step 204, measurement computer causes programming one or more CAM entries of switch 108 with redirect instructions. The redirect instructions may comprise CAM-programmable bit strings and masks with redirect options, which cause configuring the CAM 112 of switch 108 to transfer incoming traffic matching the CAM entries to measurement computer 120. In an embodiment, a CAM-string is representative of the demography of the users; over time the string may change to reflect the current usage of the application and may be reprogrammed. Atomic programming may ensure uninterrupted redirection while the CAM is reprogrammed.

In an embodiment, responses from servers 130 are redirected. Programming at step 204 also may include or may be preceded by an administrator configuring an interception policy of the switch 108 for an appropriate traffic type, such as Web/SSL or RDP traffic and the percentage of traffic to redirect. Selecting a subset of traffic to monitor at step 202 may be performed by selecting traffic flows relatively randomly unless the configured percentage of traffic is selected.

In an embodiment, measurement computer 120 should receive user session communication for the duration of a session. Therefore, the traffic data logic 110 may be used to preserve existing traffic flows to the measurement computer 120 at the time that the CAM is reprogrammed to intercept different traffic flows.

At step 206, client computer 102 issues an HTTP request to one of the servers 130, typically in connection with interacting with a client-server application that is hosted at one of the servers 130. The HTTP request arrives at switch 108. Assuming that the request matches a CAM entry that has been programmed for redirection, at step 208 the request is redirected to the measurement computer 120. The measurement computer 120 inspects the received request and determines that it is a request and not a response from a server; therefore, no writing is required, but the measurement computer may record one or more timestamp values associated with the request, as indicated at step 210. For example, the measurement computer 120 may log a date-time at which the client request was received at the measurement computer, and/or a date-time at which the client issued the request, if such a value is carried in the request.

At step 212, the measurement computer 120 forwards the request to the server 130. The server 130 processes the request using an application program hosted at the server, resulting in forming and sending a response to the client as seen at step 214. The response arrives at switch 108 and matches an entry in the CAM 112, causing the switch to redirect the response to the measurement computer 120. The measurement computer 120 recognizes the response as a server response and therefore rewrites an HTML payload of the response to embed a copy of a measurement reporting script 124, as shown in step 218. In step 220, measurement computer 120 forwards the rewritten response to the client computer 102.

Rewriting a response at step 218 occurs at the measurement computer 120, and does not require modifying a server application program hosted at server 130, and does not require modifying a browser hosted at client computer 102. Rewriting a response at step 218 may include testing the value of a flag or other stored variable indicating whether the measurement reporting script 124 was previously provided to the same client computer 102 as part of a prior server response. For example, measurement computer 120 may comprise data storage that stores a mapping of flow identifiers to flag values indicating whether the measurement reporting script 124 was previously provided to a client computer 102 associated with the flow identifier.

Referring now to FIG. 3, after receiving the response resulting from forwarding step 220, a browser hosted at client computer 102 parses the received response, resulting in the browser executing the measurement reporting script in the browser as shown at step 302.

Executing the measurement reporting script in the browser typically occurs without significantly affecting a user interface displayed to the end user of the client computer 102, although in certain browsers the URLs of or more measurement reporting requests may be visible in a status field of the browser user interface as data transfers occur. In some embodiments, executing the management reporting script may cause the browser to set or reset one or more cookies on the client computer 102 that store analytics information for later reporting to the measurement computer 120.

Executing the measurement script may cause the client computer 102 to determine one or more timestamp values or other performance metrics that relate to interaction of the client computer 102 or the browser with server 130 or the server application program(s) hosted at the server. For example, executing the measurement script may cause the client computer 102 to determine date-time values at which subsequent client requests are sent and at which subsequent server responses are received. At step 306, an HTTP request may be issued from the client 102 to the server 130 in connection with an interaction with a client-server application program hosted at the server. As part of step 302, executing the measurement script causes the browser to record a timestamp for a date-time of the request in main memory of the client computer 102.

At step 308, the request arrives at switch 108, matches a CAM entry based on the identity of client 102 as indicated in a network address or other parameter of a header of the request, and is redirected to the measurement computer 120. In step 312, the measurement computer 120 determines that the client request is not a server response needing rewriting, so the request is forwarded to the server 130. At step 314, the server forms and sends a response to the client. The response arrives at switch 108 and is redirected at step 316 based on a matching CAM entry to measurement computer 120. At step 320, the measurement computer 120 determines that it previously provided the measurement reporting script 124 to the client computer 102 that is the destination of the server's response. Therefore, the response is forwarded to the client computer 102 without rewriting or providing the script.

At step 322, upon receiving the server response, the measurement reporting script executing in the browser of the client computer 102 may determine and store a date-time value representing the time of receiving the response. For example, client computer determines and stores a relative time for the Total Time to First Byte (TTFB) and the Time to Last Byte (TTLB), and a time at which page rendering is complete in response to a page load event. Thus, the principal performance metric is application performance as perceived by the end user or client computer, measured in terms of overall application response time including both network response time and application server response time. In some embodiments, other performance metrics may be determined and stored either in non-volatile storage or in main memory. Example performance metrics include but are not limited to the time incurred in downloading a page from the server 130 may be measured and stored; connection bandwidth; the maximum transmission unit (MTU) value then currently in effect for a transport layer connection that is carrying the HTTP traffic representing client-server application program requests and responses; number of bytes received; whether a fragmentation bit has been set; values of quality of service parameters or fields in the IP header; and others.

At step 322, to report one or more timestamp values, the measurement reporting script causes the client computer 102 to open a connection to the measurement computer 120 and to report the values. Reporting may comprising issuing one or more HTTP GET requests that include query parameter values or other forms of payloads that carry the timestamp values or other performance metrics. To receive and process requests via HTTP, the measurement computer 120 may host an HTTP server. An example of the form of an HTTP GET request for reporting performance data is:
GET /perftool/perfmon/post.html?ResponseId= p30fi2z00x1x5glacqvakm3duh 183&StartTime= 1168643852687&EndTime= 1168643852734&HTMLEndTime=116864 3852703&URL=http://12.20.99.201/irj/portalapps/ com.sap.portal.htmlb/jsli b/empty hover.html&Method=Image HTTP/1.1

At step 324, the measurement computer 120 stores one or more performance records using the received timestamp values. The records may be stored locally at measurement computer 120 or in networked storage. Additionally or alternatively, in response to receiving a report from the client computer 102, the measurement computer 120 may pass received timestamp values or other metrics to other logic, such as an independent performance analysis program, or to a separate network management station. Various embodiments may pass the received timestamp values and metrics using programmatic means within the measurement computer 120, such as by calling an application programming interface (API) function of a performance analysis program, or by communicating messages from the measurement computer to another management station or application over the network.

At any time during FIG. 2, FIG. 3, measurement computer 120 may reprogram the CAM-string based on changes in the distribution of IP addresses for traffic flowing through switch 108. In an embodiment, flow selection logic 121 incorporates a timer that periodically causes issuing new commands or queries to traffic data logic 110 to identify the then-current main source IP addresses or families that are generating the most traffic through switch 108, and to re-sample the addresses or families until a specified or configured percentage of traffic is selected. The flow selection logic 121 then generates one or more new CAM programming strings and bit masks with redirect options, and causes reprogramming CAM 112 to redirect the newly selected flows or traffic. Consequently, operation of the system of FIG. 1 and the processes of FIG. 2, FIG. 3 is dynamic and adapts to changes in traffic patterns in the network. Therefore, output data relating to performance measurement reflects, more accurately, the actual experience of end users of the application programs.

As a result, measurement computer 120, other performance analysis applications, or other network management systems can receive and analyze client request times, server response times, and other performance metrics that are reported directly from a client computer 102 and therefore represent the perspective of an end user at the client. The measurement computer 120, other performance analysis applications, or other network management systems can generate output in the form of reports or displays that represent analysis, aggregation or summarization of received performance metrics. For example, output may include total response time, server response time, Total Time to First Byte (TTFB) representing the time that it took for the browser to receive the first byte of a server response, the Total Time to Last Byte (TTLB) representing the time that it took for the browser to receive the last byte. Output may include a difference between the TTFB and the Server Response Time, representing the latency added by the network. Output may include a difference between TTLB–TTFB, indicating the delay due to the download of the HTML code. Output may also indicate the time required browser to render the content, for example, from the browser making conditional GET requests to validate embedded objects referenced in an HTML container.

The disclosed approach has numerous benefits in comparison with other approaches. For example, the present approach may be configured to divert only a fraction of all traffic at the switch to the measurement computer 120, so that the measurement computer is not overwhelmed, and so that a web-based application at the servers 130 is not degraded. Further, the present approach relies on switch 108—that is, a networking element—to redirect specific portions of the traffic, unlike approaches that require the application to be modified and use no intelligence in the network. Moreover, hardware logic in the switch 108, such as CAM 112, performs traffic redirection and therefore the present approach does not degrade the performance of applications at servers 130 by avoiding inserting a software appliance into the communication path between the client computers 102, 104, 106 and the servers.

In addition, the present approach does not require changes to the web-based application at servers 130. The present approach can interoperate with existing performance analysis tools, such as Cisco Appscope, for purposes of displaying application performance metrics such as server response time, network latency, client rendering time, etc. Alternatively, determining, recording and/or displaying performance metrics may be performed using performance recording logic 126 or another logical element of measurement computer 120. Integration with an existing performance analysis tool may allow easier troubleshooting of performance related issues. Consequently, the approach herein provides improved scalability and more in-depth information on application performance.

In various embodiments, the approach of FIG. 2, FIG. 3 may be performed both before and after the deployment of a server virtualization layer, to enable an administrator to measure the performance of server 130 before and after implementation of VMWARE or another virtualization mechanism. Similarly, the approach of FIG. 2, FIG. 3 could be performed both before and after a server or data center consolidation project to enable an administrator to measure and compare the performance of servers 130 before and after consolidation.

The analysis of performance measurements obtained using the techniques herein may lead to various remedial steps. For example, detecting an excessive number of conditional GETs can be fixed by using Cisco Flashforward feature or, in some cases, an optimized version of the web-based application, if available. A long download time can be addressed by using data compression. Consistent occurrence of network or internetwork delays could be addressed by seeking alternative routing. An excessive server response time in a load balanced farm can be caused by an improper VMWARE ESX server configuration, such as lack of memory, failure to configure Receive Side Scaling (RSS) or Netqueue, or other issues.

As an example, assume that a Service Provider is reducing the number of datacenters worldwide by consolidating the applications in fewer locations. Therefore, a portion of the SP's application users will access the application from a site that is further away from where they used to access the application from. The SP is also virtualizing the servers in order to take full advantage of the hardware that it already owns. Therefore the SP is concerned about the potential degradation in the user experience associated with this project and needs a tool to isolate potential problems and make sure that they are not caused by the adoption of virtualization. By using the hardware-based sampling approach herein, the SP can define to capture only 30% of the traffic that is flowing client-to-server and more specifically only the HTTP traffic. This traffic is redirected to the measurement computer 120, which provides in graphical format the following information: Overall latency per user prefix; how latency is broken up into server response time, network-related latency, and browser rendering time.

3.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
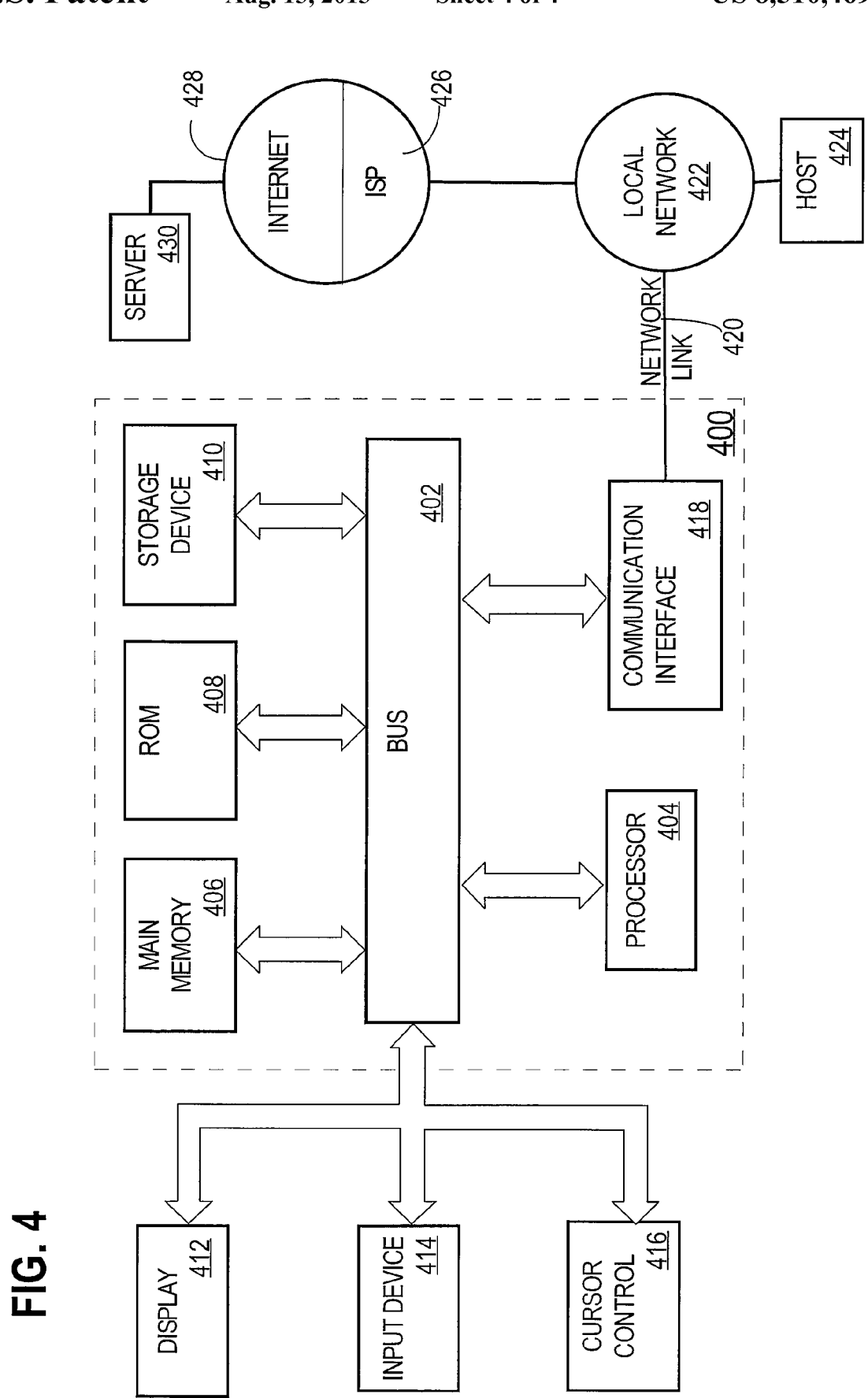
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

4.0 Extensions and Alternatives

In the foregoing specification, embodiments of the invention have been described with reference to numerous specific details that may vary from implementation to implementation. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing system, comprising:
   a packet data switching system, comprising a content-addressable memory configured to redirect, via a first redirection, to a measurement computer, a request to access a server application program hosted at a server computer in response to receiving the request from a client computer, and to redirect a response to the request to the measurement computer via a second redirection;

the measurement computer, comprising: request rewriting logic configured:
to receive the request of the client computer via the first redirection based on the content-addressable memory of the switching system,
to record a first time value representing a time of receiving the request,
to forward the request to the server application program,
to receive, via the second redirection, the response from the content-addressable memory to the request,
to rewrite a payload of the response by embedding a browser-executable measurement reporting script into the payload, and to forward the rewritten response to the client computer.

2. The system of claim 1, wherein the measurement computer further comprises performance recording logic configured to receive a second time value from the client computer based on the client computer executing the measurement reporting script, and to store a performance record that includes at least the first time value and the second time value.

3. The system of claim 1, wherein the content-addressable memory is a programmable ternary content-addressable memory (TCAM).

4. The system of claim 1, wherein the request comprises a universal resource locator (URL), wherein the payload comprises hypertext markup language (HTML), and wherein the measurement reporting script comprises JavaScript.

5. The system of claim 1, wherein the packet data switching system is within a data center that includes the server computer.

6. The system of claim 1, wherein the client computer is a handheld wireless computer.

7. The system of claim 1, wherein the measurement computer and the server computer are coupled to the switching system, wherein the measurement computer is logically separated from a logical data path between the client computer to the server computer.

8. The system of claim 1, wherein the switching system further comprises network flow storage logic configured to store network flow records representing network traffic that the switching system has processed; wherein the measurement computer further comprises network flow analysis logic configured to select a subset of the flow records and to reprogram one or more entries in the content-addressable memory of the switching system to cause redirecting, to the measurement computer, requests from client computers that are identified in the selected subset of the flow records.

9. The system of claim 1, wherein the server application program is unmodified, wherein no software is installed on the client computer, and wherein the measurement computer is physically or logically distant from the client computer.

10. The system of claim 1, wherein the packet data switching system comprises any of a packet data switch and a packet data router.

11. A computer-implemented method, comprising:
programming a content-addressable memory of a packet data switching system to redirect, via a first redirection, to a measurement computer, a request to access a server application program hosted at a server computer in response to receiving the request from a client computer, and to redirect a response to the request to the measurement computer via a second redirection;
receiving the request of the client computer via the first redirection based on the content-addressable memory of the switching system;
recording a first time value representing a time of receiving the request;
forwarding the request to the server application program;
receiving, via the second redirection, the response from the content-addressable memory to the request;
rewriting a payload of the response by embedding a browser-executable measurement reporting script into the payload;
forwarding the rewritten response to the client computer;
receiving a second time value from the client computer based on the client computer executing the measurement reporting script;
storing a performance record that includes at least the first time value and the second time value.

12. The method of claim 11, wherein the programming comprises programming a ternary content-addressable memory (TCAM).

13. The method of claim 11, wherein the request comprises a universal resource locator (URL), wherein the payload comprises hypertext markup language (HTML), and wherein the measurement reporting script comprises JavaScript.

14. The method of claim 11, wherein the programming is performed on the packet data switching system located within a data center that includes the server computer.

15. The method of claim 11, wherein the request is received from a client computer comprising a handheld wireless computer.

16. The method of claim 11, wherein the measurement computer and the server computer are coupled to the switching system, wherein the measurement computer is logically separated from a logical data path from the client computer to the server computer.

17. The method of claim 11, further comprising:
storing network flow records representing network traffic that the switching system has processed;
selecting a subset of the flow records;
reprogramming one or more entries in the content-addressable memory of the switching system to configure the switching system for redirecting, to the measurement computer, requests from client computers that are identified in the selected subset of the flow records.

18. The method of claim 11, wherein the server application program is unmodified, wherein no software is installed on the client computer, and wherein the measurement computer is physically or logically distant from the client computer.

19. A non-transitory computer-readable storage medium storing one or more sequences of instructions which, when executed by one or more processors, cause performing:
programming a content-addressable memory of a packet data switching system to redirect, via a first redirection, to a measurement computer, a request to access a server application program hosted at a server computer in response to receiving the request from a client computer, and to redirect a response to the request to the measurement computer via a second redirection;
receiving the request of the client computer via the first redirection based on the content-addressable memory of the switching system;
recording a first time value representing a time of receiving the request;
forwarding the request to the server application program;
receiving, via the second redirection, the response from the content-addressable memory to the request;
rewriting a payload of the response by embedding a browser-executable measurement reporting script into the payload;
forwarding the rewritten response to the client computer;

receiving a second time value from the client computer based on the client computer executing the measurement reporting script;

storing a performance record that includes at least the first time value and the second time value.

20. The non-transitory computer-readable storage medium of claim 19, wherein the programming comprises programming a ternary content-addressable memory (TCAM).

21. The non-transitory computer-readable storage medium of claim 19, wherein the request comprises a universal resource locator (URL), wherein the payload comprises hypertext markup language (HTML), and wherein the measurement reporting script comprises JavaScript.

22. The non-transitory computer-readable storage medium of claim 19, wherein the programming is performed on the packet data switching system located within a data center that includes the server computer.

23. The non-transitory computer-readable storage medium of claim 19, wherein the request is received from a client computer comprising a handheld wireless computer.

24. The non-transitory computer-readable storage medium of claim 19, wherein the measurement computer and the server computer are coupled to the switching system, wherein the measurement computer is logically separated from a logical data path from the client computer to the server computer.

25. The non-transitory computer-readable storage medium of claim 19, further comprising instructions which when executed cause performing:

storing network flow records representing network traffic that the switching system has processed;

selecting a subset of the flow records;

reprogramming one or more entries in the content-addressable memory of the switching system to configure the switching system for redirecting, to the measurement computer, requests from client computers that are identified in the selected subset of the flow records.

26. The non-transitory computer-readable storage medium of claim 19, wherein the server application program is unmodified, wherein no software is installed on the client computer, and wherein the measurement computer is physically or logically distant from the client computer.

27. A computer, comprising one or more processors;

request rewriting logic coupled to the one or more processors and configured to receive a request of a client computer to access a server application program hosted at a server computer, via a first redirection based on a content-addressable memory of a packet data switching system that has been configured to redirect, to record a first time value representing a time of receiving the request, to forward the request to the server application program, to receive, via a second redirection, a response from the content-addressable memory to the request, to rewrite a payload of the response by embedding a browser-executable measurement reporting script into the payload, and to forward the rewritten response to the client computer.

28. The computer of claim 27, further comprising performance recording logic coupled to the one or more processors and configured to receive a second time value from the client computer based on the client computer executing the measurement reporting script, and to store a performance record that includes at least the first time value and the second time value.

29. The computer of claim 27, wherein the content-addressable memory is a programmable ternary content-addressable memory (TCAM).

30. The system of claim 27, wherein the switching system further comprises network flow storage logic configured to store network flow records representing network traffic that the switching system has processed; wherein the measurement computer further comprises network flow analysis logic configured to select a subset of the flow records and to reprogram one or more entries in the content-addressable memory of the switching system to cause redirecting, to the measurement computer, requests from client computers that are identified in the selected subset of the flow records.

* * * * *